(12) United States Patent  (10) Patent No.: US 9,028,764 B2
Huang                      (45) Date of Patent:     May 12, 2015

(54) ELECTRO-CATALYTIC HONEYCOMB FOR EXHAUST EMISSIONS CONTROL

(71) Applicant: Ta-Jen Huang, Hsinchu (TW)

(72) Inventor: Ta-Jen Huang, Hsinchu (TW)

( * ) Notice: Subject to any disclaimer, the term of this patent is extended or adjusted under 35 U.S.C. 154(b) by 597 days.

(21) Appl. No.: 13/666,593

(22) Filed: Nov. 1, 2012

(65) Prior Publication Data

US 2014/0120003 A1     May 1, 2014

(51) Int. Cl.
    *F01N 3/022*   (2006.01)
    *F01N 3/24*    (2006.01)
    *B01D 53/86*   (2006.01)
    *B01D 53/32*   (2006.01)
    *B01D 53/92*   (2006.01)

(52) U.S. Cl.
    CPC ............ *B01D 53/8625* (2013.01); *B01D 53/32* (2013.01); *B01D 53/925* (2013.01)

(58) Field of Classification Search
    None
    See application file for complete search history.

(56) References Cited

U.S. PATENT DOCUMENTS 5,401,372 A    3/1995  Liu et al.
2010/0287916 A1*  11/2010  Vernoux et al. ............. 60/299

OTHER PUBLICATIONS

Yoshinobu et al. Development of ECR (Electro-Chemical Reduction) System for Simultaneous Reduction of NOx and PM in Diesel Exhaust. [PDF document]. 2011. http://www.google.com/url?sa=t&rct=j&q=&esrc=s&frm=1&source=web&cd=1&ved=0CB4QFjAA&url=http%3A%2F%2Frisoecampus.dtu.dk%2FResearch%2Fsustainable_energy%2Fnew_energy_technologies%2F.*

* cited by examiner

*Primary Examiner* — Walter D Griffin
*Assistant Examiner* — Jelitza Perez
(74) *Attorney, Agent, or Firm* — Muncy, Geissler, Olds & Lowe, P.C.

(57) ABSTRACT

An electro-catalytic honeycomb for controlling exhaust emissions, which adopts to purify a lean-burn exhaust, comprises a honeycomb structural body, a solid-oxide layer and a cathode layer. The honeycomb structural body includes an anode, a plurality of gas channels, and a shell. The anode is formed as a backbone, the gas channels are formed inside the backbone for passing the exhaust, and the shell covers an outer surface of the anode. The solid-oxide layer is adhered to an inner surface of the anode and connects the shell so as to encapsulate the anode. The cathode layer is adhered to a tube wall of the solid-oxide layer and has an oxidizing environment. The anode has a reducing environment. The reducing and the oxidizing environment facilitate an electromotive force to occur between the anode and the cathode layer to promote a decomposition of nitrogen oxides of the exhaust into nitrogen and oxygen.

10 Claims, 5 Drawing Sheets

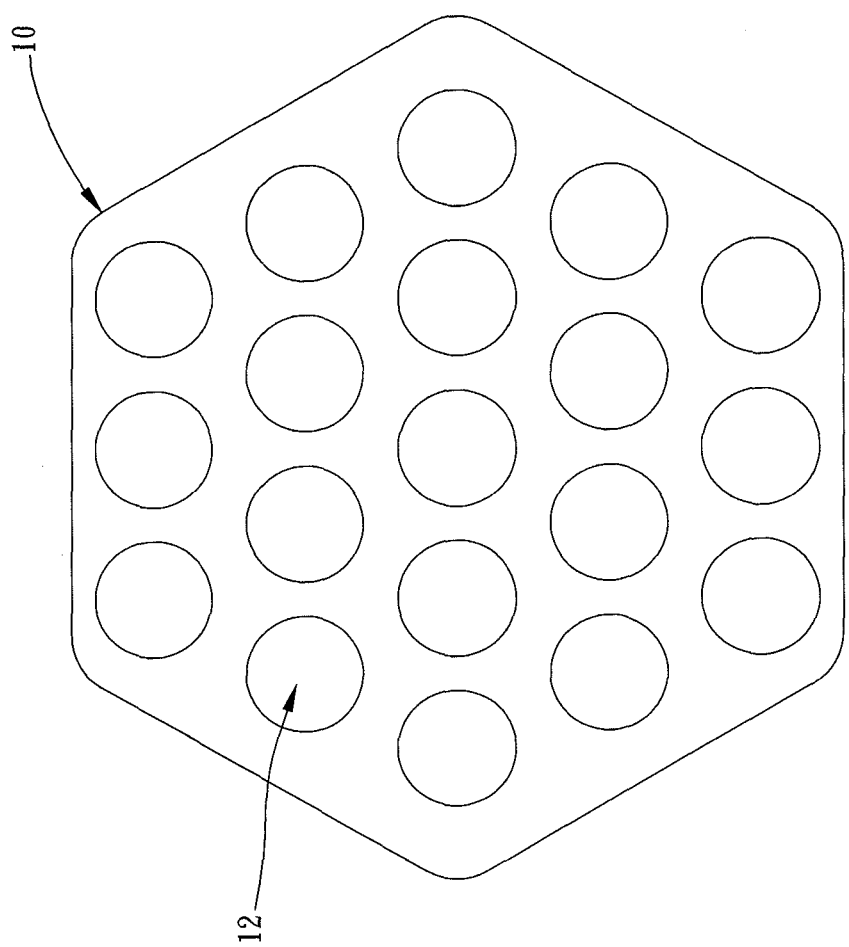

ELECTRO-CATALYTIC HONEYCOMB FOR EXHAUST EMISSIONS CONTROL

FIELD OF THE INVENTION

The present invention relates to an electro-catalytic honeycomb, particularly to an electro-catalytic honeycomb for controlling exhaust emissions to effectively decompose nitrogen oxides ($NO_x$) and oxidize carbon monoxide (CO), hydrocarbons (HCs) and particulate matter (PM) in exhaust gas.

BACKGROUND OF THE INVENTION

Fresh and clean air is essential for human health. Science and technology has promoted economical development. However, the exhausts of vehicles and factories, especially motor vehicles and heavy industry factories, seriously pollute the air.

The emission standard of motor vehicles has been increased persistently. However, the continuously increasing motor vehicles still brings about more and more serious air pollution. In a motor vehicle, the engine thereof burns fuel and converts chemical energy into mechanical energy. The burning process of fuel generates the polluting constituents, including nitrogen oxides ($NO_x$), carbon monoxide (CO), hydrocarbons (HCs), and particulate matter (PM), which would form photochemical smog, deplete ozone, enhance the greenhouse effect, cause acid rain, damage the ecological environment and finally danger human health.

Carbon monoxide comes from incomplete combustion. The capability of carbon monoxide to combine with hemoglobin to form carboxyhemoglobin (COHb) is 300 times higher than the capability of oxygen to combine with hemoglobin to form oxyhemoglobin ($HbO_2$). Therefore, too high a concentration of carbon monoxide would degrade the capability of hemoglobin to transport oxygen. Nitrogen oxides are generated by the combination of nitrogen and oxygen and mainly in form of nitrogen monoxide (NO) and nitrogen dioxide ($NO_2$). Reaction of nitrogen oxides and hydrocarbons is induced by ultraviolet ray, generating poisonous photochemical smog, which has a special odor, irritates eyes, harm plants, and reduces the visibility of the ambient air. Nitrogen oxides can react with water in the air to form nitric acid and nitrous acid, which are the constituents of acid rain. Hydrocarbons can irritate the respiratory system even at lower concentration and will affect the central nervous system at higher concentration. Particulate matter can danger human health and can even cause cancer.

Therefore, many nations, including EU, USA, Japan and Taiwan, have regulated stricter emission standards for nitrogen oxides, carbon monoxide, hydrocarbons and particulate matter, such as BINS of USA and EURO 6 of EU, which not only regulate the emissions of the polluting constituents but also encourage the manufacturers to develop, fabricate or adopt the newest pollution control technologies and apparatuses.

A U.S. Pat. No. 5,401,372 disclosed an "Electrochemical Catalytic Reduction Cell for the Reduction of $NO_x$ in an $O_2$-Containing Exhaust Emission", which is dedicated to removing nitrogen oxides, wherein an electrochemical-catalytic reducing reaction and a vanadium pentaoxide ($V_2O_5$) catalyst convert nitrogen oxides into nitrogen. However, the prior art needs an electric source to power an electrochemical cell. Therefore, the prior art consumes power and cannot eliminate other polluting constituents simultaneously.

A U.S. patent application Ser. No. 13/362,247 disclosed an "Electrocatalytic Tube of Electrochemical-Catalytic Converter for Exhaust Emissions Control", which can eliminate nitrogen oxides ($NO_x$), carbon monoxide (CO), hydrocarbons (HCs), and particulate matter (PM) in the exhaust, and which comprises the electrocatalytic tubes that can be assembled to form a honeycomb monolith to be an advanced electrochemical-catalytic converter, wherein the nitrogen oxides are decomposed into nitrogen and oxygen, and wherein carbon monoxide, hydrocarbons, and particulate matter are oxidized into water and carbon dioxide. Therefore, the prior art can eliminate multiple polluting constituents simultaneously without consuming power or reducing gas.

However, the honeycomb monolith of the abovementioned "Electrochemical-Catalytic Converter" needs one half of the channels to be sealed to form the electrocatalytic tubes; this decreases the treating area, in comparison to the conventional honeycomb as automotive catalytic converter, and also increases the fabrication cost. Therefore, the prior art has room to be improved.

SUMMARY OF THE INVENTION

The primary objective of the present invention is to overcome the problems of the honeycomb of the conventional electrochemical-catalytic converter, including low treating area and high fabrication cost.

To achieve the abovementioned objective, the present invention proposes an electro-catalytic honeycomb for controlling exhaust emissions, which adopts to purify a lean-burn exhaust. The electro-catalytic honeycomb comprises a honeycomb structural body, a solid-oxide layer and a cathode layer. The honeycomb structural body comprises an anode which is formed as a backbone of the honeycomb structural body, a plurality of gas channels formed inside the backbone for passing the lean-burn exhaust, and a shell covering an outer surface of the anode. The anode is made of a first porous material and has a reducing environment. The shell is formed of a first dense structure. The solid-oxide layer is adhered to an inner surface of the anode opposite to the outer surface, which is formed of a second dense structure and has a tube wall facing the gas channels. The solid-oxide layer connects the shell so as to encapsulate the anode completely. The cathode layer is adhered to the tube wall, which is made of a second porous material and has an oxidizing environment. The solid-oxide layer is disposed between the anode and the cathode layer. The reducing environment and the oxidizing environment facilitates an electromotive force to occur between the anode and the cathode layer to promote a decomposition of nitrogen oxides of the lean-burn exhaust into nitrogen and oxygen on the cathode layer. The oxidizing environment of the lean-burn exhaust over the cathode layer can further enable the oxidation of carbon monoxide, hydrocarbons, and particulate matter of the exhaust.

In the present invention, all of the channels of the electro-catalytic honeycomb can be used for exhaust treatment. Additionally, the electro-catalytic honeycomb is easier to be fabricated than the honeycomb of the conventional electrochemical-catalytic converter. Thus, the present invention has larger areas for treatment and lower fabrication cost than the honeycomb of the conventional electrochemical-catalytic converter.

BRIEF DESCRIPTION OF THE DRAWINGS

FIG. 5 is a front view schematically showing an electro-catalytic honeycomb according to a third embodiment of the present invention.

DETAILED DESCRIPTION OF THE PREFERRED EMBODIMENTS

The technical contents of the present invention are described in detail in cooperation with drawings below.

Figure 1:
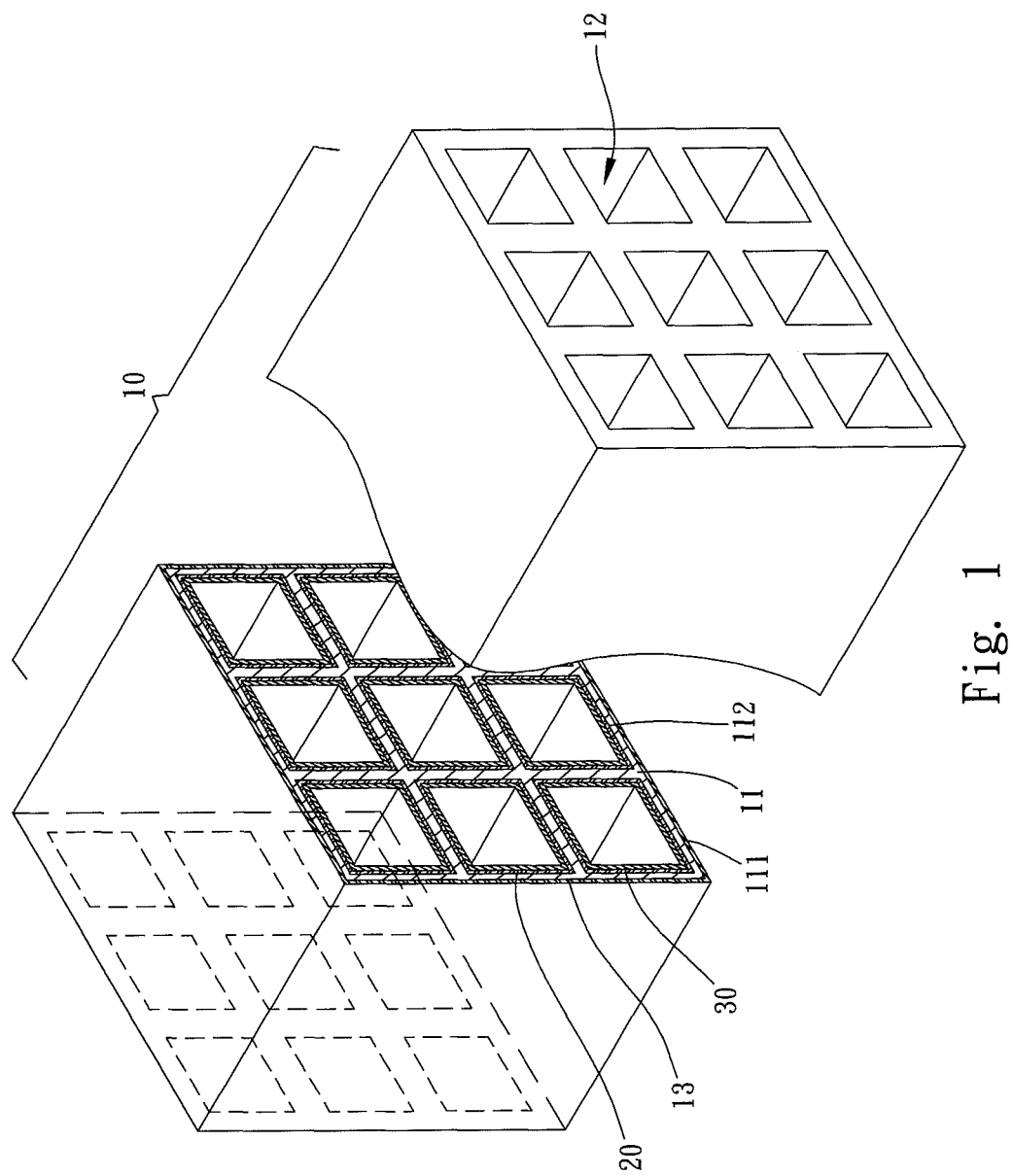
FIG. 1 is a perspective view schematically showing an electro-catalytic honeycomb according to a first embodiment of the present invention.
Figure 2:
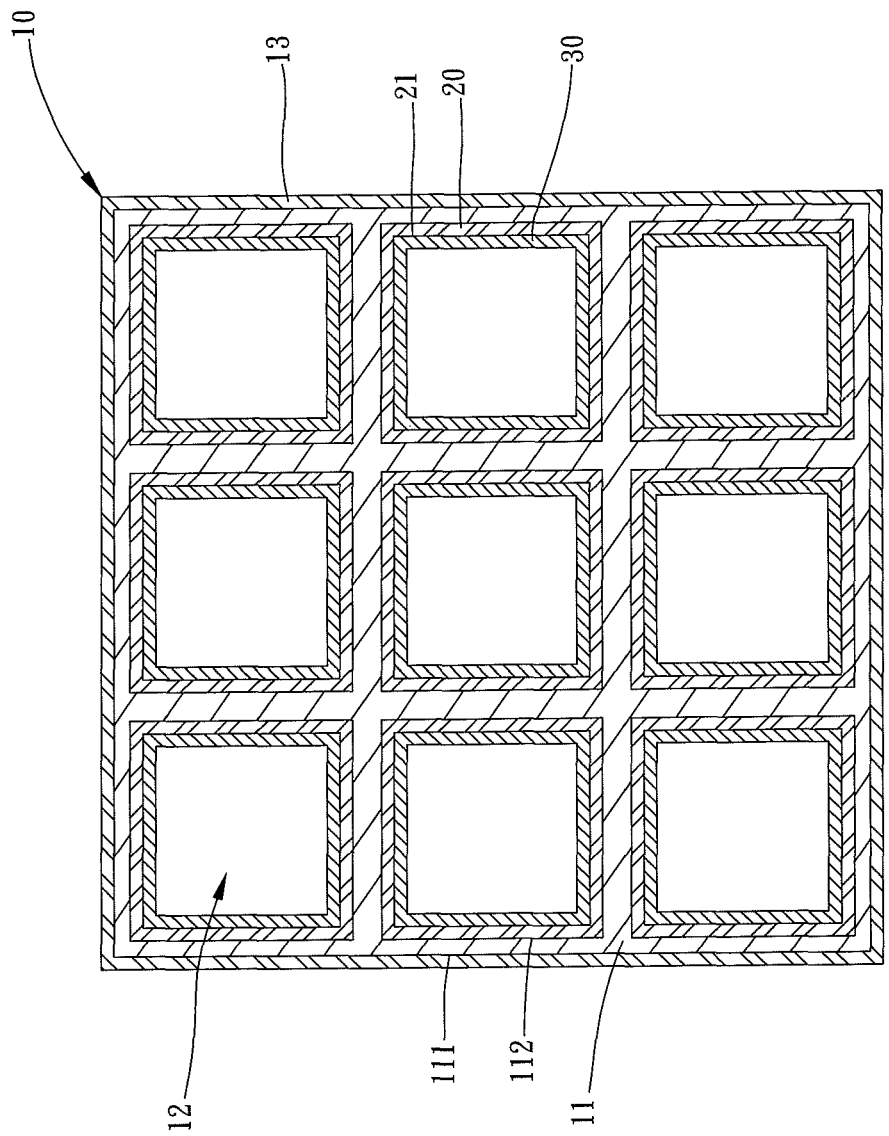
FIG. 2 is a sectional view schematically showing an electro-catalytic honeycomb according to the first embodiment of the present invention.
Figure 3:
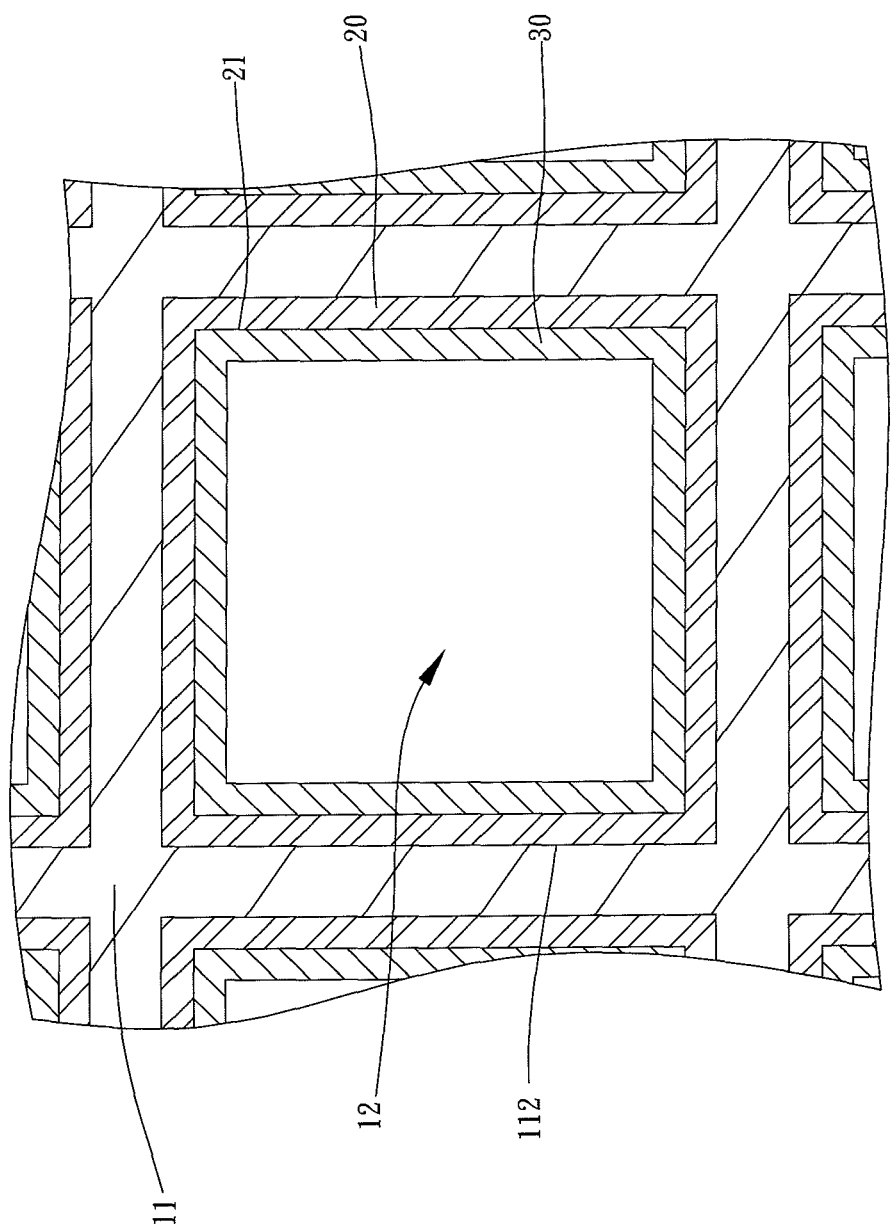
FIG. 3 is a local sectional view schematically showing an electro-catalytic honeycomb according to the first embodiment of the present invention.

Refer to FIG. 1, FIG. 2 and FIG. 3 which respectively show a perspective view, a sectional view and a local sectional view schematically of an electro-catalytic honeycomb according to a first embodiment of the present invention. The electro-catalytic honeycomb of the present invention adopts to purify a lean-burn exhaust containing nitrogen oxides ($NO_x$), carbon monoxide (CO), hydrocarbons (HCs), and particulate matter (PM). The electro-catalytic honeycomb comprises a honeycomb structural body 10, a solid-oxide layer 20 and a cathode layer 30. The honeycomb structural body 10 comprises an anode 11, a plurality of gas channels 12, and a shell 13. The anode 11 is formed as a backbone of the honeycomb structural body 10. In this embodiment, the anode 11 is made of a first porous material having a plurality of pores, such as a cermet of a metal and a fluorite metal oxide, a fluorite metal oxide, a perovskite metal oxide, a metal-added fluorite metal oxide or a metal-added perovskite metal oxide, such as a cermet of nickel and YSZ (Yttria-Stabilized Zirconia). The gas channels 12 are formed inside the backbone and run through two opposite ends of the honeycomb structural body 10 for passing the lean-burn exhaust. The shell 13 covers an outer surface 111 of the anode 11. And the shell 13 is formed of a first dense structure. The shell 13 is made of a metal, a ceramics, or a glass, such as stainless steel, alumina, or quartz glass.

The solid-oxide layer 20 is adhered onto an inner surface 112 of the anode 11 opposite to the outer surface 111 and connects the shell 13 at two opposite ends of the anode 11 so as to encapsulate the anode 11 completely, which has a reducing environment formed therein. The solid-oxide layer 20 has a tube wall 21 facing the gas channels 12. And the solid-oxide layer 20 is formed of a second dense structure and may have an oxygen-ion conductivity. The solid-oxide layer 20 is made of a fluorite metal oxide or a perovskite metal oxide, such as YSZ, GDC (Gadolinia-Doped Ceria), or lanthanum-strontium-gallium-magnesium oxide (LSGM).

The cathode layer 30 is adhered onto the tube wall 21 of the solid-oxide layer 20 such that the solid-oxide layer 20 is interposed between the anode 11 and the cathode layer 30. In this embodiment, the cathode layer 30 is made of a second porous material having a plurality of pores, such as a perovskite metal oxide, a fluorite metal oxide, a metal-added perovskite metal oxide, or a metal-added fluorite metal oxide, such as lanthanum-strontium-cobalt-copper oxide, lanthanum-strontium-manganese-copper oxide, a combination of lanthanum-strontium-cobalt-copper oxide and GDC, a combination of lanthanum-strontium-manganese-copper oxide and GDC, silver-added lanthanum-strontium-cobalt-copper oxide, silver-added lanthanum-strontium-manganese-copper oxide, a combination of silver-added lanthanum-strontium-cobalt-copper oxide and GDC, and a combination of silver-added lanthanum-strontium-manganese-copper oxide and GDC.

In the present invention, the anode 11 is formed from a material containing a metal oxide initially. During fabrication, the metal oxide is reduced to a metal by treating with a reducing gas. For example, nickel oxide is reduced to nickel. In one embodiment, the metal oxide may be reduced to an oxygen-deficient metal oxide so as to form the reducing environment of the anode 11. Alternatively, carbon monoxide or hydrocarbons may be added into the anode 11 before the solid-oxide layer 20 connects the shell 13 so as to encapsulate the anode 11 completely. For example, methane, ethane, propylene or propane is introduced into the anode 11 through pore diffusion to form a carbon species adhering to the pores that enhances the reducing environment of the anode 11. In addition, the gas inside the pores of the anodes 11 can be extracted to form a sub-atmospheric pressure or vacuum in the anode 11 before the anode 11 is encapsulated completely, whereby the honeycomb structural body 10 is exempted from the structural damage caused by thermally-induced expansion and contraction during the purification of the lean-burn exhaust.

Figure 4:
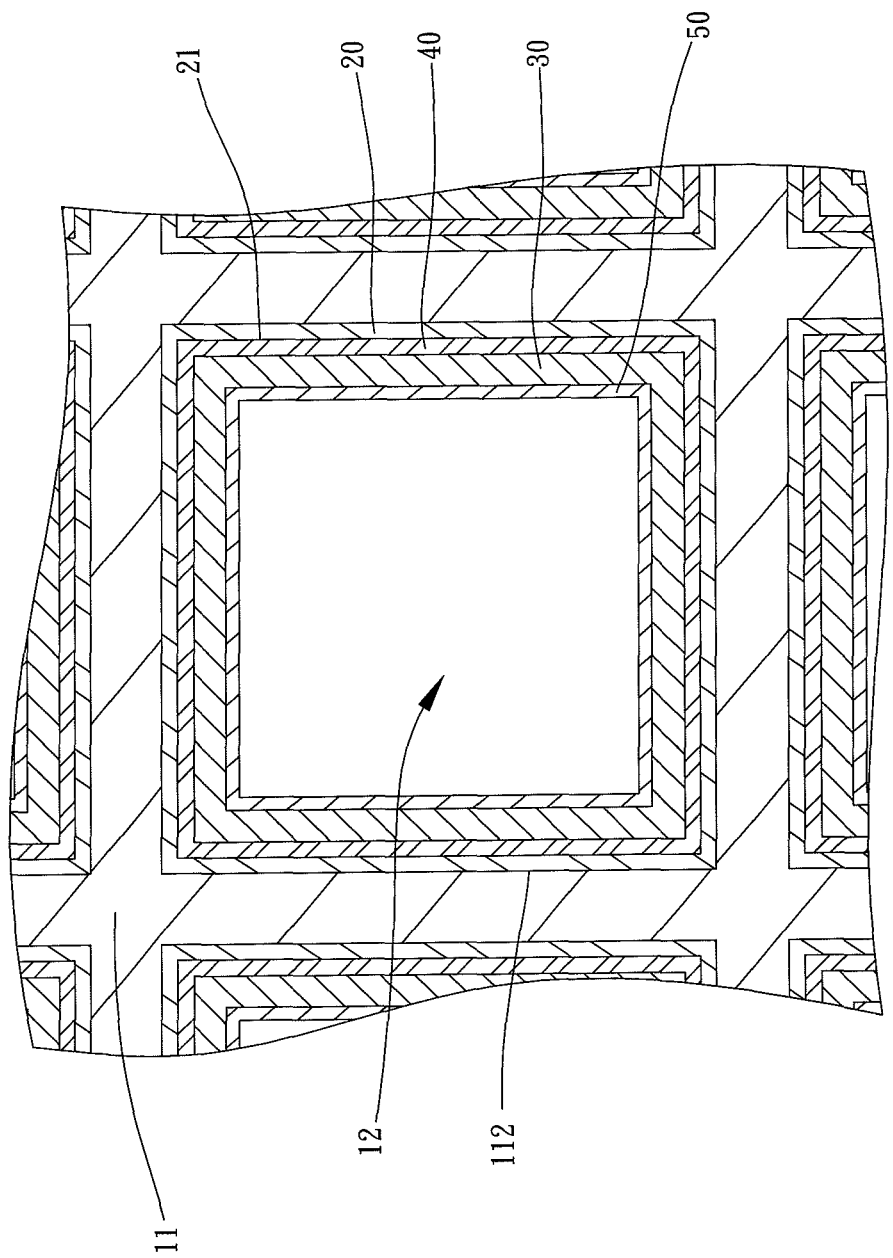
FIG. 4 is a local sectional view schematically showing an electro-catalytic honeycomb according to a second embodiment of the present invention.

Refer to FIG. 4 which shows a local sectional view of an electro-catalytic honeycomb according to a second embodiment of the present invention. In this embodiment, the electro-catalytic honeycomb further comprises an interlayer 40 disposed between the cathode layer 30 and the solid-oxide layer 20 such that the adherence between the cathode layer 30 and the solid-oxide layer 20 is improved. The interlayer 40 may be made of a fluorite metal oxide or a perovskite metal oxide, such as GDC.

In the second embodiment, the electro-catalytic honeycomb may further include a catalytic oxidation layer 50 to assist in oxidation of a constituent of the exhaust which is hard to oxidize on the cathode layer 30. The catalytic oxidation layer 50 adheres to the cathode layer 30 and is made of a metal, an alloy, a fluorite metal oxide, or a perovskite metal oxide, such as palladium, GDC, or lanthanum-strontium-manganese oxide.

Below is described the process of purifying the exhaust. Firstly, place the electro-catalytic honeycomb of the present invention in an environment of the exhaust. The exhaust is a lean-burn exhaust and thus is oxygen-rich and can be further enriched with oxygen via adding a secondary air. The working temperature of the electro-catalytic honeycomb is from ambient temperature to 800° C. The exhaust contains nitrogen oxides, carbon monoxide, hydrocarbons, and particulate matter. The purifying reactions undertaken by the present invention include a decomposition reaction of removing nitrogen oxides and an oxidation reaction of removing carbon monoxide, hydrocarbons, and particulate matter.

Nitrogen oxides include nitrogen monoxide (NO) and nitrogen dioxide ($NO_2$). Nitrogen monoxide is decomposed into nitrogen and oxygen on the cathode layer 30. The reaction of NO decomposition is expressed by Formula (1):

$$2NO \rightarrow N_2 + O_2 \quad (1)$$

Nitrogen dioxide is decomposed into nitrogen monoxide and oxygen on the cathode layer 30. The reaction of $NO_2$ decomposition is expressed by Formula (2):

$$2NO_2 \rightarrow 2NO + O_2 \quad (2)$$

Then, nitrogen monoxide is further decomposed into nitrogen and oxygen on the cathode layer 30.

The reducing environment of the anode 11 and the oxidizing environment in the cathode layer 30 results in a difference of the oxygen partial pressure between the anode 11 and the cathode layer 30 and thus generate an electromotive force (emf) between the anode 11 and the cathode layer 30 according to Formula (3):

$$emf=[(RT)/(4F)]\cdot \ln[(P_{O2|Cathode})/(P_{O2|Anode})] \quad (3)$$

wherein R is the gas constant, T the absolute temperature, F the Faradic constant, and $P_{O2}$ the partial pressure of oxygen. The metal or the oxygen-deficient metal oxide of the anode 11 or the carbon species adhering to the pores of the anode 11 is a reducing compound which results in an environment equivalent to a lower oxygen partial pressure over the anode 11 and thus results in the generation of larger electromotive force. Different reducing compounds on the anode 11 result in different oxygen partial pressures and thus generate different electromotive forces. Different oxygen concentrations on the cathode side also result in different oxygen partial pressures and thus generate different electromotive forces. The higher the oxygen concentration on the cathode side is, the larger the electromotive force is generated and thus the greater promotion of decomposing nitrogen oxides into oxygen and nitrogen is resulted. Thus, although the lean-burn exhaust is at an oxidizing environment which alone can generate an electromotive force, adding the secondary air into the exhaust results in a larger electromotive force. Within a given temperature range, the lower the temperature is, the higher the decomposition rate is resulted. The decomposition of nitrogen oxides is as effective at ambient temperature as at higher temperature.

As to eliminating carbon monoxide, hydrocarbons and particulate matter of the exhaust, the exhaust is oxygen-rich or can be further enriched with oxygen via adding the secondary air. Then, the cathode layer 30 and the catalytic oxidation layer 50 convert carbon monoxide, hydrocarbons, and particulate matter into harmless gases. For example, carbon monoxide is oxidized into carbon dioxide; hydrocarbons (HCs) and particulate matter (carbon-containing) are oxidized into carbon dioxide and water. The reactions thereof are expressed by Formulae (4)-(6):

$$2CO+O_2 \rightarrow 2CO_2 \quad (4)$$

$$HCs+O_2 \rightarrow H_2O+CO_2 \quad (5)$$

$$C+O_2 \rightarrow CO_2 \quad (6)$$

Via the abovementioned catalytic decomposition reactions and catalytic oxidation reactions, the polluting constituents of the exhaust are effectively removed.

Refer to FIG. 5 which shows a front view of an electro-catalytic honeycomb according to a third embodiment of the present invention. In this embodiment, the cross section of the honeycomb structural body 10 is formed as a hexagon and the cross section of the gas channels 12 is formed as a circle. However, the cross sections of the honeycomb structural body 10 and the gas channels 12 are not limited to the above shapes, but may be of any optimum shapes depending on the requirement.

In conclusion, the present invention uses the difference in the oxygen partial pressures between the anode side and the cathode side to generate the electromotive force to promote the catalytic decomposition reaction. Further, the present invention has compact structure and lower fabrication cost. Moreover, the present invention has a compact size able to be installed underneath the passenger cars for eliminating the polluting constituents of the exhaust and thus reducing air pollution.

Therefore, the present invention possesses utility, novelty and non-obviousness and meets the condition for a patent. Thus, the Inventors file the application for a patent. It is appreciated if the patent is approved fast.

The embodiments described above are only to exemplify the present invention but not to limit the scope of the present invention. Any equivalent modification or variation according to the spirit of the present invention is to be also included within the scope of the present invention.

What is claimed is:

1. An electro-catalytic honeycomb for controlling exhaust emissions, which adopts to purify a lean-burn exhaust, comprising:
   a honeycomb structural body comprising an anode which is formed as a backbone of the honeycomb structural body, a plurality of gas channels formed inside the backbone for passing the lean-burn exhaust, and a shell covering an outer surface of the anode, the anode being made of a first porous material and having a reducing environment, and the shell being formed of a first dense structure;
   a solid-oxide layer adhering to an inner surface of the anode opposite to the outer surface and connecting the shell so as to encapsulate the anode completely, and the solid-oxide layer being formed of a second dense structure and having a tube wall facing the gas channels; and
   a cathode layer adhering to the tube wall which is made of a second porous material and has an oxidizing environment, and the solid-oxide layer being disposed between the anode and the cathode layer;
   wherein the reducing environment and the oxidizing environment facilitates an electromotive force to occur between the anode and the cathode layer to promote a decomposition of nitrogen oxides of the lean-burn exhaust into nitrogen and oxygen on the cathode layer.

2. The electro-catalytic honeycomb for controlling exhaust emissions according to claim 1, wherein the anode has a plurality of pores for adhering a carbon species.

3. The electro-catalytic honeycomb for controlling exhaust emissions according to claim 1, wherein the anode is made of a material selected from a group consisting of cermet of metals and fluorite metal oxides, perovskite metal oxides, fluorite metal oxides, metal-added fluorite metal oxides, metal-added perovskite metal oxides, and combinations thereof.

4. The electro-catalytic honeycomb for controlling exhaust emissions according to claim 1, wherein the shell is made of a material selected from a group consisting of metals, ceramics, glasses, and combinations thereof.

5. The electro-catalytic honeycomb for controlling exhaust emissions according to claim 1, wherein the solid-oxide layer is made of a material selected from a group consisting of fluorite metal oxides, perovskite metal oxides, and combinations thereof.

6. The electro-catalytic honeycomb for controlling exhaust emissions according to claim 1, wherein the cathode layer is made of a material selected from a group consisting of perovskite metal oxides, fluorite metal oxides, metal-added perovskite metal oxides, metal-added fluorite metal oxides, and combinations thereof.

7. The electro-catalytic honeycomb for controlling exhaust emissions according to claim 1, wherein an interlayer is interposed between the cathode layer and the solid-oxide layer so as to promote the adherence between the cathode layer and the solid-oxide layer.

8. The electro-catalytic honeycomb for controlling exhaust emissions according to claim 7, wherein the interlayer is made of a material selected from a group consisting of fluorite metal oxides, perovskite metal oxides, and combinations thereof.

9. The electro-catalytic honeycomb for controlling exhaust emissions according to claim 1, wherein a catalytic oxidation layer is adhered to the cathode layer.

10. The electro-catalytic honeycomb for controlling exhaust emissions according to claim 9, wherein the catalytic oxidation layer is made of a material selected from a group consisting of metals, alloys, fluorite metal oxides, perovskite metal oxides, and combinations thereof.

\* \* \* \* \*